United States Patent [19]

Stone, Jr.

[11] 3,962,548

[45] June 8, 1976

[54] DIRECT READOUT EXHIBITOR FOR DETERMINING LONG DISTANCE TELEPHONE CHARGES

[76] Inventor: Wayne B. Stone, Jr., 7307 Nevis Road, Bethesda, Md. 20034

[22] Filed: May 8, 1974

[21] Appl. No.: 468,202

Related U.S. Application Data

[63] Continuation of Ser. No. 413,571, Nov. 7, 1973, abandoned.

[52] U.S. Cl. .......................... 179/7.1 R; 58/152 T
[51] Int. Cl.² ........................................ H04M 15/18
[58] Field of Search ................ 179/7.1 R, 7.1 TP; 58/152 T, 152 R; 35/35 E, 35 D; 281/15 R; 40/336, 337

[56] References Cited
UNITED STATES PATENTS

| | | | |
|---|---|---|---|
| 2,075,056 | 3/1937 | Rich | 179/7.1 R |
| 2,216,528 | 10/1940 | Willis | 179/7.1 R |
| 2,584,997 | 2/1952 | Ferguson | 179/7.1 R |
| 2,629,781 | 2/1953 | Feinstein | 179/7.1 R |
| 2,917,325 | 12/1959 | Sines | 35/35 E |
| 3,136,858 | 6/1964 | Conviser et al. | 179/7.1 R |
| 3,673,793 | 7/1972 | Barnard | 179/7.1 R |
| 3,767,862 | 10/1973 | Grushow | 179/7.1 R |

FOREIGN PATENTS OR APPLICATIONS

| | | | |
|---|---|---|---|
| 473,517 | 7/1969 | Switzerland | 179/7.1 R |

*Primary Examiner*—Kathleen H. Claffy
*Assistant Examiner*—Gerald L. Brigance
*Attorney, Agent, or Firm*—Colton & Stone, Inc.

[57] ABSTRACT

A changeable exhibitor incorporating a timing device displays, as a function of time indicating intervals, a direct visual readout of the telephone charges for a direct dial call between any two points in the continental United States.

5 Claims, 5 Drawing Figures

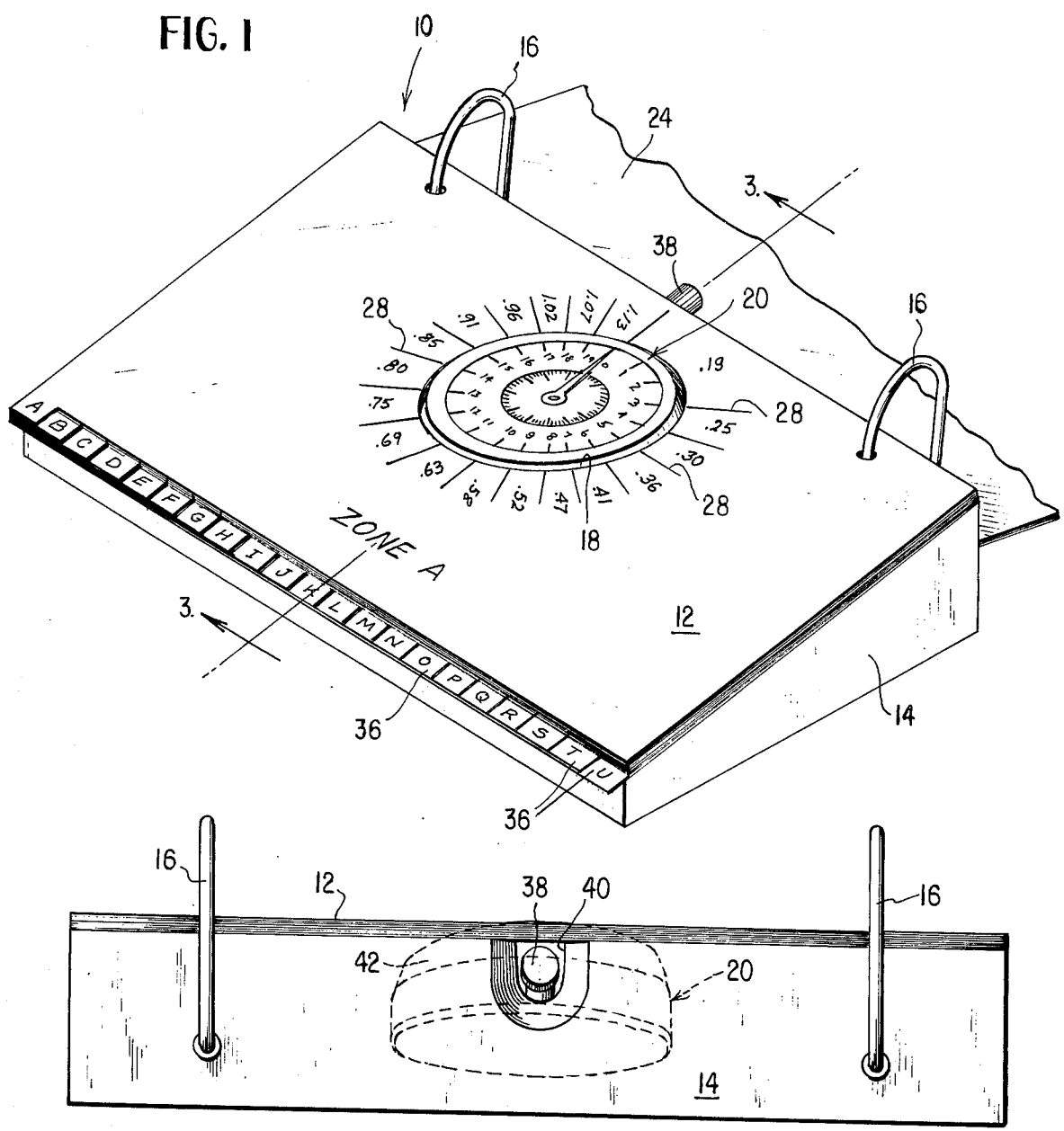
FIG. 1
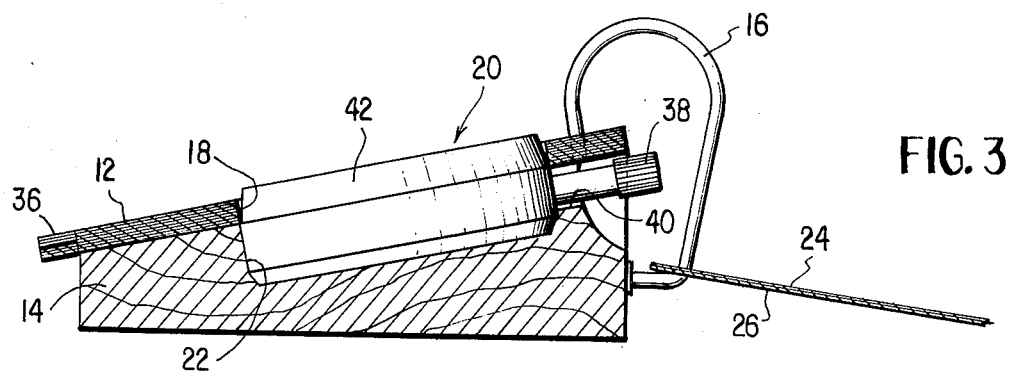
FIG. 2
FIG. 3

DIRECT READOUT EXHIBITOR FOR DETERMINING LONG DISTANCE TELEPHONE CHARGES

This application is a continuation of application Ser. No. 413,571, filed Nov. 7, 1973, now abandoned.

BACKGROUND OF THE INVENTION

There are numerous business operations in which it is necessary to determine, for billing purposes, the charges for long distance telephone calls at the time they are placed. This is normally accomplished by placing the call through an operator requesting a call back with time and charges.

The use of operator assistance in the placement of long distance calls not only results in telephone charges substantially in excess of direct dial charges but, also, involves a time loss on the part of both the operator and calling party. From the standpoint of time loss it is apparent that the placement of two calls is required in the case of a single long distance call when it is necessary to know the charges; e.g. a first call to the operator and a subsequent call from the operator to report charges.

Although the direct dial rates between certain large cities have been publicly disseminated along with mileage rate breakdowns to, theoretically, permit the calling party to determine the charges for a direct dial call, as a practical matter this information is not widely employed for that purpose. This, presumably, for the reasons that time loss on the part of the calling party is greater than using operator assistance and accurate, resettable timing devices are not part of the usual office inventory.

The purpose of the invention is to enable a calling party to directly read the charges for a direct dial call to any point in the continental United States immediately upon completion of the call and without operator assistance.

SUMMARY OF THE INVENTION

A changeable exhibitor displaying, as a function of indicating time intervals, a direct visual readout of the direct dial charges for each of the 21 telephone rate zones throughout the continental United States includes a timing device, such as a stop watch, for indicating the elapsed time interval and charges for a particular long distance call.

DESCRIPTION OF THE DRAWINGS

FIG. 1 is a perspective view of a changeable exhibitor illustrating the same just prior to the placement of a call to rate zone A from which a direct readout of direct dial telephone charges will be had upon completion of the call;

FIG. 2 is a rear elevation of the changeable exhibitor;

FIG. 3 is a cross-sectional view taken along line 3—3 of FIG. 1;

DESCRIPTION OF THE PREFERRED EMBODIMENT

Figure 4:
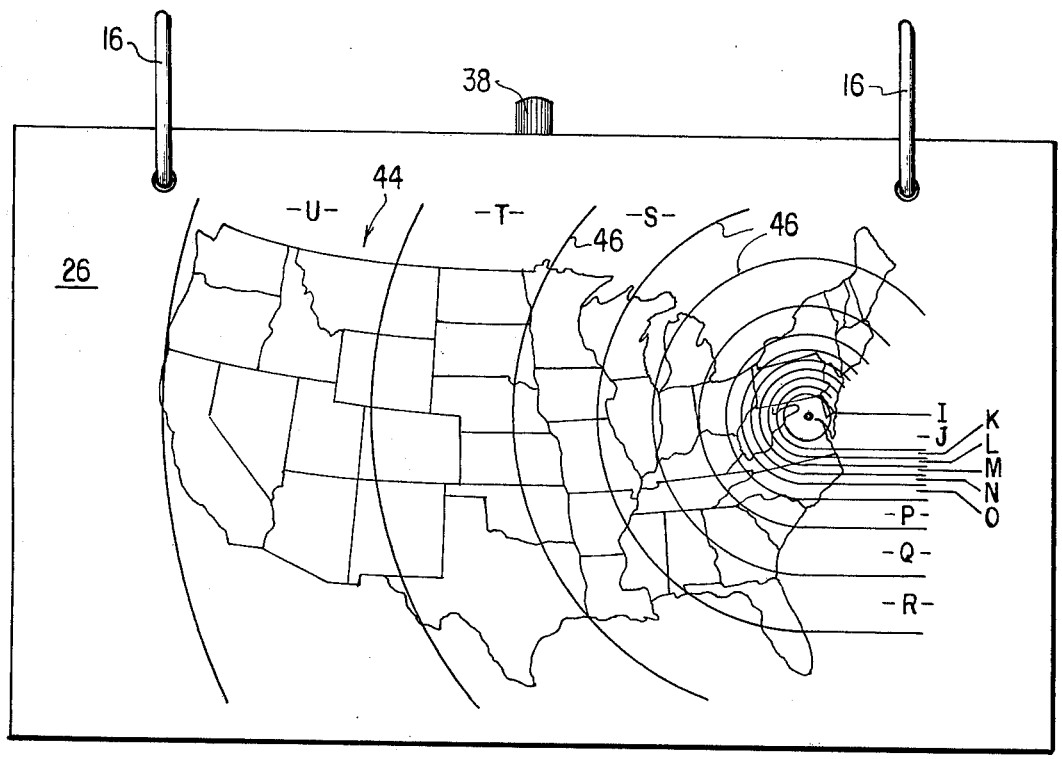
FIG. 4 is a plan view of an overlay map indicating various rate zones throughout the continental United States.

A changeable exhibitor 10 is illustrated in FIGS. 1–3 as comprising a plurality of apertured exhibitor panels 12 loosely hinged to base 14 via hinge rods 16 for selective movement of the panel apertures 18 into and out of surrounding concentric relation to a stop watch 20 removably received within a recess 22 in base 14. Preferably, a pair of imperforate overlay map panels 24, 26 are similarly hinged to base 14 for indicating the various rate zones adjacent and remote from the locale of the calling party.

The apertured panels 12 are identically scribed, about the peripheries of apertures 18, with lines 28 radiating from the center of stop watch 20, to form geometrically congruent charge indicating indicial arrays. Thus while the charge indicating indicial array on each panel 12 is identical in an initial large spacing corresponding to a 3 minute interval and subsequent, identical smaller spacings corresponding to one minute intervals, the actual charge figures appearing between the lines 28 are, for the most part, different since they indicate the weekday 8 A.M. – 5 P.M. direct dial charges, including tax, from the calling point to the particular rate zone whose charge indicating indicial array is exposed.

Although a conventional stop watch having the minutes time indicating indicial array radially inwardly of the seconds time indicating array may be employed, it is preferable to mount the longer hand 30 for minutes indication and employ a dial face 32 having the minute interval markings 34 at the outer periphery of the dial. Since the minute interval markings 34 provide an annular time indicating indicial array of lesser radius than the annular charge indicating indicial arrays on apertured panels 12, the annular time and charge indicating arrays on the stop watch and panels, respectively, are geometrically similar thus assuring appropriate alignment of the interval marks 28 and 34.

Each of the 21 apertured panels corresponding to the 21 rate zones are indexed with the appropriate tab 36 and the charges for the first 3 minutes plus charges for each subsequent minute of a call placed to an individual rate zone are entered between lines 28. Stop watch 20 is provided with the usual start, stop and reset crown 38 exposed through a slot 40 in base 14 to permit accurate timing of each call. Conventional stop watches include an upper conical case section 42 which centers and aligns the various apertured panels 12 as they are moved into surrounding relation to the watch as best illustrated in FIG. 3.

The imperforate overlay map panels 24, 26 comprise, respectively, a large scale immediate map area (not shown) of the locale surrounding the calling point indicating the nearer zone delineations such as rate zones A–H for example and a small scale map 44 of the continental United States delineating the remainder of the rate zones.

It will be apparent that the set of apertured panels 12 will include the same charge figures for use throughout the continental United States but that the imperforate overlay maps, based upon mileage from the calling point, will be different for each metropolitan area. Thus with reference to FIG. 4, the rate zone map 44 is laid out with respect to Washington, D.C. as the calling point while zone delineation lines, similar to the lines 46, would be laid out with respect to any other metropolitan area in a similar fashion.

Figure 5:
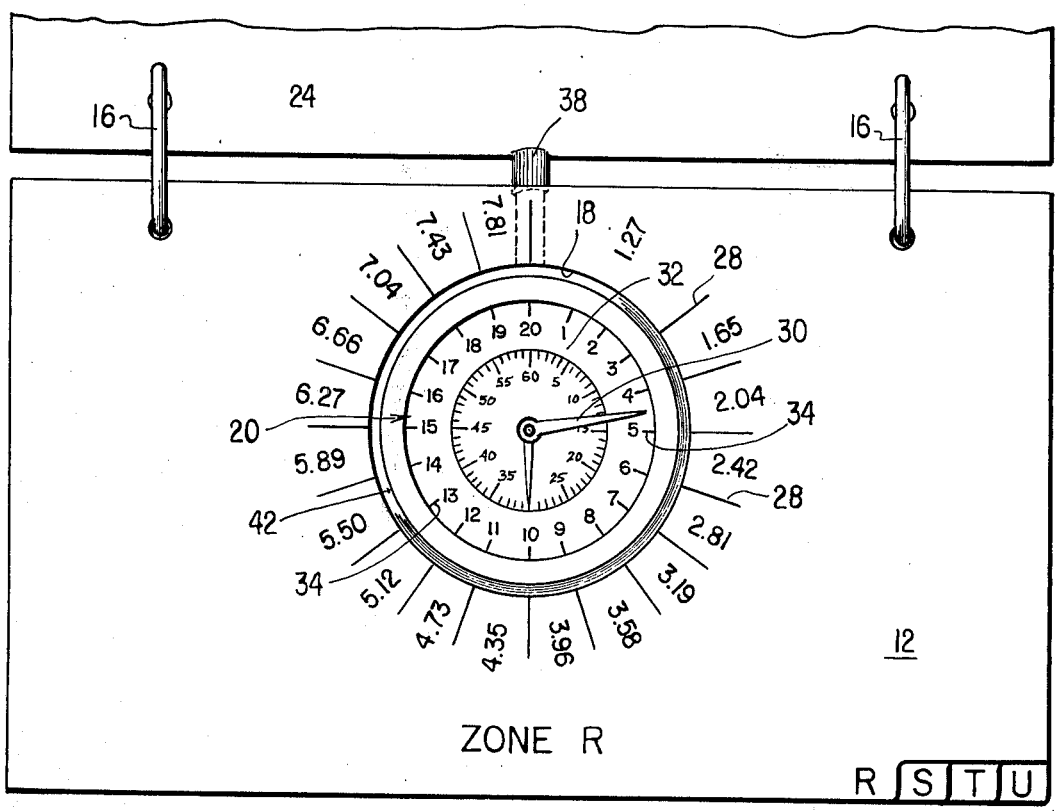
FIG. 5 is a plan view of the changeable exhibitor following the completion of a call of 4½ minutes duration to rate zone R.

In use, reference is first made to one of map overlays 24, 26 to determine the rate zone to be called and one of the tabs 36 manipulated to expose the appropriate panel 12. Thus, for example, if it is desired to call Memphis, Tennessee from Washington, D.C., reference to map 44 shows that Memphis lies within rate zone R which corresponding panel is then exposed as in FIG. 5. When the called party answers the stop watch is started and upon completion of the call, say for example 4½ minutes later, the stop watch is stopped and the telephone charges, including tax, is read directly from the zone R panel 12 as $2.04.

For initial use of the system it will be preferable to provide a separate booklet including individual state maps showing the zone delineations in large scale which, once ascertained, may be entered with the area code and phone number of frequently called numbers to obviate further reference to zone maps when calling the same party.

I claim:

1. A direct readout telephone charge indicator for determining long distance charges incurred, comprising; a timing device having a visual time indicating indicial array and start, stop and reset means; a multiplicity of changeable exhibitor means each having geometrically congruent charge indicating indicial arrays geometrically similar to said time indicating indicial array and representative of long distance charge zones; and means mounting said changeable exhibitor means for selective movement into and out of juxtaposition to said timing device whereby the charge on a selected exhibitor means may be directly read by corresponding reference to the geometrically similar arrays on the timing device and selected exhibitor means.

2. The telephone charge indicator of claim 1 wherein said timing device comprises a time piece having a dial face thereon and said time indicating indicial array comprises an annular array on said face; and said charge indicating indicial arrays comprising annular arrays whose radius exceeds that of said time indicating indicial array.

3. The telephone charge indicator of claim 2 wherein said changeable exhibitor display means include viewing means for displaying said dial face when the changeable exhibitor display means and time piece are in juxtaposition.

4. The telephone charge indicator of claim 3 wherein said changeable exhibitor display means comprise hinged panels and said viewing means comprise a circular aperture in each said panel; the radius of each said circular aperture exceeding the radius of said time indicating indicial array; and said hinged panels being selectively moveable into and out of mutually superposed surrounding relation to said dial face whereby the dial face may be directly viewed through the panel apertures and correlated with the charge indicating indicial array on the uppermost of a plurality of superposed panels.

5. The telephone charge indicator of claim 4 wherein the radius of said aperture is substantially equal to an outer timepiece case radius for guiding said panels into substantial alignment upon movement of said panels into said superposed surrounding relation.

\* \* \* \* \*